United States Patent Office 3,085,017  
Patented Apr. 9, 1963

3,085,017  
PROCESS OF MAKING A CONFECTION  
Gunther Wilfredo Fieck, 1247 Wood Valley Road, Mountainside, N.J.  
No Drawing. Filed Apr. 10, 1961, Ser. No. 101,676  
3 Claims. (Cl. 99—134)

This invention relates to a confection, such as jam or candy.

The invention has for its salient object to provide a palatable confection or jam that will be useful as a spread or for frosting or as candy in the nature of fudge.

Further objects of the invention will appear from the following specification.

The product has for its base, milk, to which are added sugar, vanilla and bicarbonate of soda, and for the candy, glucose and butter.

The ingredients for sixty quarts of the jam are as follows:

Milk (fat content of not less than 3–3½%) _gallons__ 25  
Sugar _____pounds__ 50  
Vanilla or flavoring extract_____ounces__ 2  
Bicarbonate of soda_____do____ 1

In carrying out the process of making the jam, the milk is first stirred to assure uniformity. The milk is then heated to 100° F. under constant stirring at 60 r.p.m. for fifteen minutes and is then heated to 150° F. for fifteen minutes and, thereafter, to 210° F. for fifteen minutes. Sugar is then added and the mixture is stirred for forty-five minutes at 75 r.p.m. and at a temperature of 205°–210° F. Bicarbonate of soda is then added to produce the desired color and the mixture is heated at 210° F. and stirred and then vanilla or other flavoring extract is added and stirring is continued for approximately ninety minutes or until the mixture has the desired consistency.

If a fudge-like candy is desired, the mixture made as above described is reduced in temperature to 190° F. and 2 pounds of glucose is added and the mixture is stirred at 80 r.p.m. The temperature is then raised to 205° F. and 1 pound of butter is added and the mixture is stirred for forty-five minutes. Then the mass is cooled to 100° F. and is poured into forms. Any desired flavoring extract may be used.

It will be clear that the same basic process can be used to produce jam or candy, but after the jam has been made, glucose and butter are added with further heating and stirring.

From the foregoing description it will be understood that an appetizing and palatable jam or candy can be economically made from simple ingredients.

Although certain specific embodiments of the invention have been particularly described, it will be evident that changes may be made without departing from the spirit or scope of the invention, as expressed in the following claims.

What I claim is:

1. The process of making a confection which consists of mixing the following ingredients in the proportions named for sixty quarts of the final product:

Milk (fat content of not less than 3 or 3½%) __gals__ 25  
Sugar _____lbs__ 50  
Vanilla or flavoring extract_____oz__ 2  
Bicarbonate of soda_____oz__ 1 the ingredients being mixed and processed as follows: stirring the milk, heating the milk to approximately 100° F. and stirring at 60 r.p.m. for approximately fifteen minutes, then heating to approximately 150° F., stirring for approximately fifteen minutes, heating to approximately 210° F. and stirring for approximately fifteen minutes, adding sugar and stirring for approximately forty-five minutes at 75 r.p.m. and at a temperature of approximately 205°–210° F., adding bicarbonate of soda and stirring and continuing heat at approximately 210° F., and adding vanilla or flavoring extract and continuing heating to 205°–210° F. and stirring for ninety minutes.

2. The process of making a confection which consists of mixing the following ingredients in the proportions named for sixty quarts of the final product:

Milk (fat content of not less than 3 or 3½%) __gals__ 25  
Sugar _____lbs__ 50  
Vanilla or other flavoring extract_____oz__ 2  
Bicarbonate of soda_____oz__ 1  
Glucose _____lbs__ 2  
Butter _____lb__ 1 the ingredients being mixed and processed as follows: stirring the milk, heating the milk to approximately 100° F. and stirring at 60 r.p.m. for approximately fifteen minutes, then heating to approximately 150° F., stirring for approximately fifteen minutes, heating to approximately 210° F. and stirring for approximately fifteen minutes, adding sugar and stirring for approximately forty-five minutes at 75 r.p.m. and at a temperature of approximately 205°–210° F., adding bicarbonate of soda and stirring and continuing heat at approximately 210° F., adding vanilla or flavoring extract and continuing heating to 205°–210° F. and stirring for ninety minutes, reducing the temperature to approximately 190° F. and adding glucose while stirring at approximately 80 r.p.m., and adding butter and continuing temperature at approximately 205° F. and stirring for approximately forty-five minutes.

3. The process of making a confection which consists of mixing the following ingredients in the proportions named for sixty quarts of the final product:

Milk (fat content not less than 3 or 3½%) ___gals__ 25  
Sugar _____lbs__ 50  
Vanilla or other flavoring extract_____oz__ 2  
Bicarbonate of soda_____oz__ 1 the ingredients being mixed and processed as follows: heating the milk successively to 100° F., 150° F. and 210° F. for successive intervals of approximately fifteen minutes each, while constantly stirring the milk, adding sugar and stirring, and adding bicarbonate of soda and stirring while maintaining the temperature at approximately 205°–210° F., and adding a flavoring extract and continuing the heating and stirring for approximately ninety minutes.

References Cited in the file of this patent

UNITED STATES PATENTS

| 236,991 | Curran | Jan. 25, 1881 |
| 1,133,205 | Weber | Mar. 23, 1915 |

FOREIGN PATENTS

| 28,547 | Great Britain | 1904 |

OTHER REFERENCES

"Everybody's Cookbook," by Lord, revised edition, Harcourt, Brace and Company, New York, pages 180, 435 and 437.